(12) United States Patent
Cui et al.

(10) Patent No.: US 10,911,294 B2
(45) Date of Patent: Feb. 2, 2021

(54) METHOD OF DIAGNOSING DATA DELIVERY OVER A NETWORK BETWEEN DATA CENTERS

(71) Applicant: VMware, Inc., Palo Alto, CA (US)

(72) Inventors: Liang Cui, Beijing (CN); Todd Sabin, Morganville, NJ (US); Weiqing Wu, Cupertino, CA (US); Siddharth Sudhir Ekbote, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 273 days.

(21) Appl. No.: 16/184,658

(22) Filed: Nov. 8, 2018

(65) Prior Publication Data

US 2020/0153680 A1    May 14, 2020

(51) Int. Cl.
  *H04L 12/24* (2006.01)
  *H04L 29/06* (2006.01)
(52) U.S. Cl.
  CPC ...... *H04L 41/0645* (2013.01); *H04L 41/0654* (2013.01); *H04L 63/029* (2013.01); *H04L 67/40* (2013.01)
(58) Field of Classification Search
  CPC ............. H04L 41/0645; H04L 41/0654; H04L 63/029; H04L 67/40
  See application file for complete search history.

(56) References Cited

U.S. PATENT DOCUMENTS

| 6,587,432 | B1 | 7/2003 | Putzolu et al. |
| 7,120,819 | B1 | 10/2006 | Gurer et al. |
| 7,392,046 | B2 | 6/2008 | Leib et al. |
| 2017/0317979 | A1* | 11/2017 | Bansal ................ H04L 63/0263 |
| 2018/0007008 | A1* | 1/2018 | Bansal ................ H04L 63/0263 |

* cited by examiner

*Primary Examiner* — Benjamin M Thieu
(74) *Attorney, Agent, or Firm* — Patterson + Sheridan, LLP

(57) ABSTRACT

The disclosure provides an approach for diagnosing a data plane of a network, wherein the network spans a first data center and a second data center, and wherein the second data center is remote to the first, the method comprising: accessing a secure connection between the first data center and the second data center; modifying, by the first performance controller, firewall settings of the first data center from a first setting to a second setting; opening on the second data center an instance of a performance tool; opening on the first data center a client of the instance of the performance tool; sending data packets over the data plane of the network; receiving the data packets; generating metrics associated with the data packets; and modifying firewall settings of the first data center from the second setting to the first setting.

20 Claims, 2 Drawing Sheets

METHOD OF DIAGNOSING DATA DELIVERY OVER A NETWORK BETWEEN DATA CENTERS

BACKGROUND

Organizations use on-premise data centers to manage computing infrastructure. Sometimes an organization wishes to expand computing resources without investing in more on-premise infrastructure. To do this, an organization might connect to a cloud data center, which can provide computing infrastructure over a network, such as the Internet. A data center that uses both on-premise and cloud resources is sometimes referred to as a "hybrid" data center system. Various connection problems might arise in the network between the on-premise and cloud data centers. A need exists for efficiently diagnosing network problems between two datacenters, and then resolving the problems, so that data between the two data centers can be delivered quickly and reliably.

SUMMARY

A method described herein provides for diagnosing a data plane of a network, wherein the network spans a first data center and a second data center, and wherein the second data center is remote to the first data center, the method comprising: accessing, by a first performance controller of the first data center, a secure connection between the first data center and the second data center; modifying, by the first performance controller, firewall settings of the first data center from a first setting to a second setting; opening on the second data center, by the first performance controller, an instance of a performance tool; opening on the first data center, by the first performance controller, a client of the instance of the performance tool; sending, by the instance of the performance tool to the client, data packets over the data plane of the network; receiving, by the client, the data packets; generating, by the client, metrics associated with the data packets; and modifying, by the first performance controller, firewall settings of the first data center from the second setting to the first setting.

Further embodiments include a non-transitory computer-readable storage medium storing instructions that, when executed by a computer system, cause the computer system to perform the method set forth above, and a computer system programmed to carry out the method set forth above.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The disclosure provides an approach for diagnosing a network, determining a cause of a network issue, and resolving the network issue. The approach involves accessing or establishing a secure connection between two data centers, and changing firewall settings from normal mode to test mode on both data centers. The approach further involves opening an instance of a network diagnostic tool at the first data center and a client for the tool on the second data center. The instance of the diagnostic tool then sends data packets to the client, while the client measures metrics associated with the data packets. The roles are then switched, and an instance of a network diagnostic tool on the second data center sends packets to a client on the first data center, while the client measures metrics associated with the data packets. The bidirectional metrics are then used to determine a cause of a network issue, to resolve the network issue, and to deliver data over the improved network.

Figure 1:
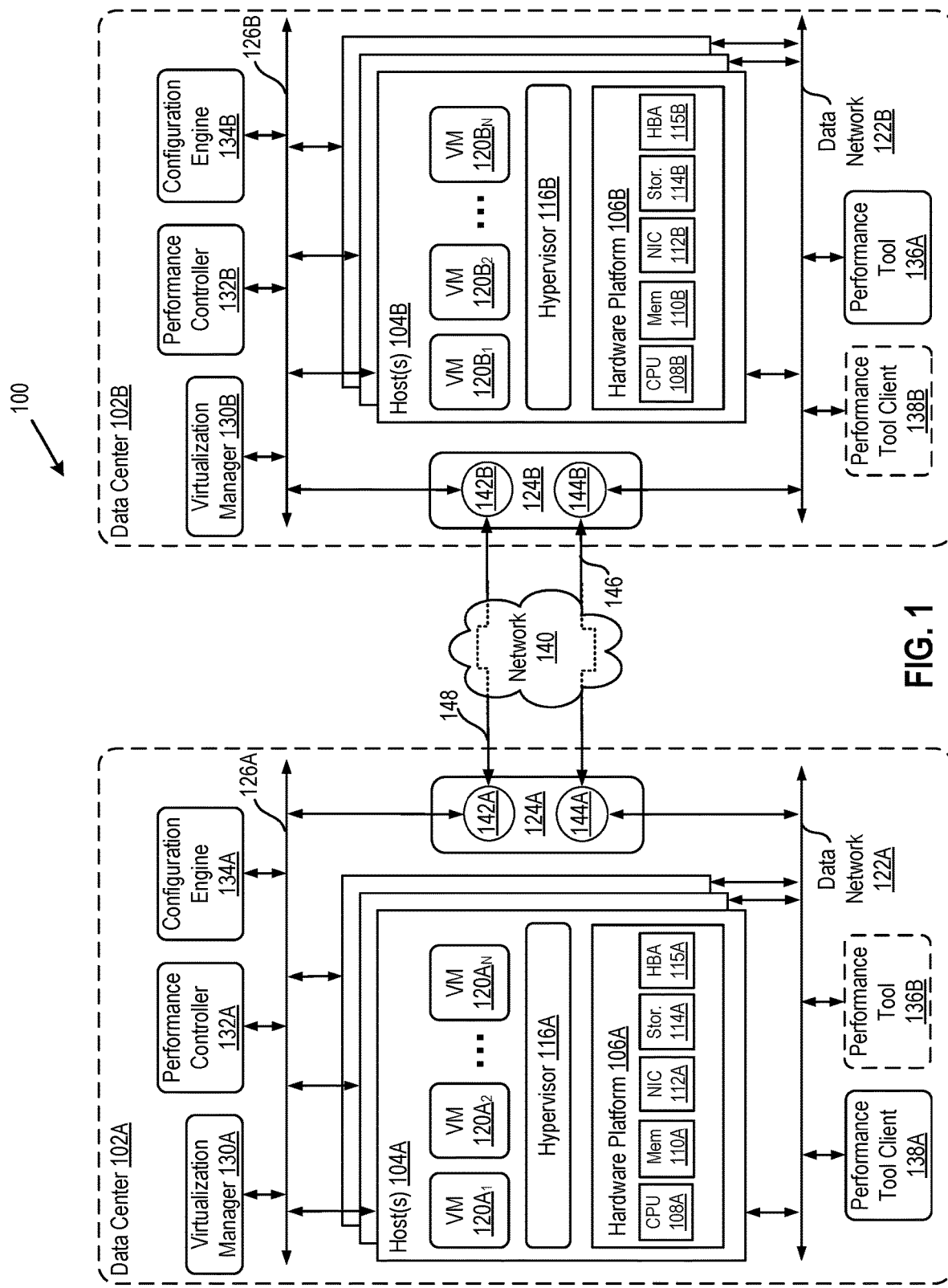
FIG. 1 depicts a block diagram of a computer system in which one or more embodiments of the present disclosure may be utilized.

FIG. 1 depicts a block diagram of a computer system 100 in which one or more embodiments of the present disclosure may be utilized. Computer system 100 comprises at least two data centers 102A and 102B connected by a network 140. Data centers 102A and 102B may be on-premise data centers or cloud data centers. Data centers 102A and 102B may be controlled by the same organization or by separate organizations. Data center 102A is substantially similar to data center 102B, and therefore, only data center 102A will be described in detail below. Analogous components between data centers 102A and 102B are labeled with the same numeral, with the difference of an "A" or "B" at the end of the numeral to denote presence within data center 102A or 102B, respectively.

Data center 102A includes host(s) 104A, a virtualization manager 130A, a performance controller 132A, a configuration engine 134A, a gateway 124A, a management network 126A, and a data network 122A. Although the management and data network are shown as separate physical networks, it is also possible in some implementations to logically isolate the management network from the data network using different virtual local area network (VLAN) identifiers. Each of hosts 104A may be constructed on a server grade hardware platform 106A, such as an x86 architecture platform. For example, hosts 104A may be geographically co-located servers on the same rack or on different racks in any arbitrary location in datacenter 102A.

Host 104A is configured to provide a virtualization layer, also referred to as a hypervisor 116A, that abstracts processor, memory, storage, and networking resources of hardware platform 106A into multiple machines $120A_1$ to $120A_N$ (collectively referred to as VMs 120A and individually referred to as VM 120A) that run concurrently on the same host. Hypervisor 116A may run on top of the operating system in host 104A. In some embodiments, hypervisor 116A can be installed as system level software directly on hardware platform 106 of host 104A (often referred to as "bare metal" installation) and be conceptually interposed between the physical hardware and the guest operating systems executing in the virtual machines. In some implementations, the hypervisor may comprise system level software as well as a "Domain 0" or "Root Partition" virtual machine, which is a privileged machine that has access to the physical hardware resources of the host. In this implementation, one or more of a virtual switch, virtual tunnel endpoint (VTEP), etc., along with hardware drivers, may reside in the privileged virtual machine. Although the disclosure is described with reference to VMs, the teachings herein also apply to other types of virtual computing instances (VCIs), such as containers, Docker containers, data compute nodes, isolated user space instances, namespace containers, and the like. In certain embodiments, VMs 120 may be containers that run on host 104A without the use of a hypervisor.

Hardware platform 106A of each host 104A includes components of a computing device such as one or more processors (CPUs) 108A, system memory 110A, a network interface 112A, storage system 114A, a local host bus adapter (HBA) 115A, and other I/O devices such as, for example, a mouse and keyboard (not shown). CPU 108A is configured to execute instructions, for example, executable instructions that perform one or more operations described herein and that may be stored in memory 110A and in storage 114A. Network interface 112A enables host 104A to communicate with other devices via a communication medium, such as data network 122A and/or management network 126A. Network interface 112A may include one or more network adapters or ports, also referred to as Network Interface Cards (NICs), for connecting to one or more physical networks. In certain embodiments, data network 122A and management network 126A may be different physical networks as shown, and the hosts 104A may be connected to each of the data network 122A and management network 126A via separate NICs or separate ports on the same NIC. In certain embodiments, data network 122A and management network 126A may correspond to the same physical network, but different network segments, such as different subnets or different logical VLAN segments.

Storage system 114A represents local persistent storage devices (e.g., one or more hard disks, flash memory modules, solid state disks, and/or optical disks). HBA 115A couples host 104A to one or more external storages (not shown), such as a storage area network (SAN) or distributed virtual SAN. Other external storages that may be used include network-attached storage (NAS) and other network data storage systems, which may be accessible via NIC 112A.

System memory 110A is hardware allowing information, such as executable instructions, configurations, and other data, to be stored and retrieved. Memory 110A is where programs and data are kept when CPU 108A is actively using them. Memory 110A may be volatile memory or non-volatile memory.

Gateway 124A is a physical or virtual gateway device (e.g., executing as a virtual appliance in a physical device) such as a router and is configured to provide VMs 120A and other components in data center 102A with connectivity to network 140. Network 140 may be, for example, a direct link, a local area network (LAN), a wide area network (WAN) such as the Internet, another type of network, or a combination of these. Gateway 124A may manage external public IP addresses for VMs 120A and route traffic incoming to and outgoing from data center 102A, as well as provide networking services, such as firewalls, network address translation (NAT), dynamic host configuration protocol (DHCP), and load balancing. In an embodiment in which gateway 124A is a virtual appliance, management interface 142A and data interface 144A may be different virtual NICs (vNICs) of gateway 124A.

Gateway 124A includes a management interface 142A and a data interface 144A. As used herein, an "interface" is a network interface such as a physical or virtual NIC, with an associated network address and a port. The interface provides functions such as passing messages, connecting and disconnecting, and the like. A network address is an identifier for a node in a network, and may include an IP address and/or a MAC address. Gateway 124A is configured such that data cannot pass between data interface 144A and management interface 142A, creating a security gap or layer between interfaces 142A and 144A. The security gap can be bridged in ways that maintain security, allowing data interface 144A and management interface 142A to communicate, when needed. Ways in which the gap can be securely bridged are described in U.S. application Ser. No. 15/701,396, filed Sep. 11, 2017.

Management interface 142A is associated with a management IP address and is connected to management network 126A and management network 148. Management network 126A is a network within data center 102A for managing nodes on data center 102A. Management network 148 is a management network connecting data center 102A and data center 102B, and allows remote managerial control of data center 102A by data center 102B and vice versa. Management interface 142A of gateway 124A provides a network address and port combination through which an administrator or managerial software components of computer system 100 can manage gateways 124A/124B and hosts 104A/104B. Exemplary managerial software components of data center 102A include virtualization manager 130A, performance controller 132A, and configuration engine 134A. A "management plane" of computer system 100 comprises management network 126A, management interface 142A, management network 148, management interface 142B, and management network 126B.

Data interface 144A is connected to data network 122A and data network 146. Data interface 144 is an interface that handles non-management data traffic. Data interface 144A of gateway 124A provides a network address and port combination through which transfer of non-management (non-control) data packets to and from gateway 124A occurs. Data network 146 is a network through which non-control data packets are sent between data centers 102A and 102B. A "data plane" of computer system 100 comprises data network 122A, data interface 144A, data network 146, data interface 144B, and data network 122B.

Data center 102A includes a management component, depicted in FIG. 1A as a virtualization manager 130A, that may communicate with the one or more hosts 104A via management network 126A. In an embodiment, virtualization manager 130A is a computer program that executes in a central server in data center 102A, or alternatively, virtualization manager 130A may run in one of VMs 120A. Virtualization manager 130A is configured to carry out administrative tasks for data center 102A, including managing hosts 104A, managing VMs 120A running within each host 104A, provisioning VMs 120A, transferring VMs 120A from one host to another host, transferring VMs 120A from data center 102A to data center 102B, and load balancing between hosts 104A and between data center 102A and data center 102B. Remote virtualization manager 130B is configured to carry out substantially similar tasks but for data center 102B, including transferring VMs 120B from data center 102B to data center 102A. One example of virtualization manager 130A is the vCenter Server™ product available from VMware, Inc.

Virtualization manager 130A may comprise a component (not shown) that is configured to manage and integrate virtualized computing resources provided by data center 102B with virtualized computing resources of data center 102A to form a unified computing platform. In such a case, virtualization manager 130A may be configured to transfer VMs 120A from source data center 102A to data center 102B, deploy VMs 120A in data center 102B, and/or perform other "cross-site" administrative tasks. One example of a component of virtualization manager 130A that can perform "cross-site" administrative tasks is the VMware vCloud Connector® product made available from VMware, Inc.

Performance controller 132A is configured to automatically change state of computer system 100 for troubleshooting and diagnosing issues on the data plane of computer system 100, to determine the issue, and to resolve the issue. Performance controller 132A may be a physical device or a virtual appliance (e.g., VM 120A) running on one of hosts 104A. Upon satisfaction of certain conditions or upon request of an administrator, performance controller initiates testing of data plane of computer system 100 so as to resolve that issue. Performance controller 132A contacts configuration engine 134A, which changes firewall rules within data center 102A to "test mode," which opens up certain paths and connections in data center 102A that would otherwise be closed for security reasons. Performance controller 132A also contacts configuration engine 134B of remote data center 102B, and configuration engine 134B change firewall rules within data center 102B to "test mode," which opens paths and connections in data center 102B that would otherwise remain closed for security reasons.

To perform diagnostics on the data plane of computer system 100, performance controller 132A opens performance tool 136A on data network 122B within remote data center 102B, and also opens a performance tool client 138A on data network 122A within data center 102A. Performance tool 136A may be one of well-known performance tools used to perform diagnostics on a computer network, such as iperf, iperf3, netperf, or ping. Performance tool 136A and performance client 138A measure computer network metrics, such as for example, bandwidth, latency, jitter, reachability, or a combination of these. Network "reachability" is the ability of one node connected to the network to reach another node connected to that same network by sending packets through that same network. The metrics are then passed on to performance controller 132A. The "network" whose metrics are measured by performance tool 136A and performance client 138A is the data plane of computer system 100, and specifically the flow of network packets from data center 102B to data center 102A on the data plane of computer system 100 is measured.

After obtaining network performance metrics, performance controller 132A may then contact remote performance controller 132B, which opens performance tool 136B on data network 122A of data center 102A, and opens performance tool client 138B on data network 122B of data center 102B. Performance tool 136B is an instance of the same software diagnostic tool as performance tool 136A. Performance tool 136B collects network metrics for packets flowing through the data plane of computer system 100, from data center 102A to 102B. The dashed lines around performance tool 136B and performance tool client 138B in FIG. 1 indicate that, in an embodiment, performance tool 136B and performance tool client 138B execute after performance tool 136A and performance tool client 138A. That is, in this embodiment, performance tool 136B does not execute at the same time as performance tool 136A.

The collecting of metrics for the data plane of computer system 100 by both performance controllers 132A/132B results in the collecting of bidirectional network metrics. Bidirectional network metrics provide for more data than unidirectional network metrics, and thus, for more robust analysis and more accurate resolution of network problems. After either performance controller 132A or 132B obtains bidirectional metrics, performance controller 132A/132B analyzes bidirectional metrics, determines the issue present within data plane of computer system 100, and resolves the issue.

For example, performance controller 132A might open the iperf performance tool on data center 102B. The iperf tool is able to measure actual bandwidth (i.e., throughput) of data between two endpoints, such as between data center 102B and data center 102A along the data plane of computer system 100. Performance controller 132A then opens a client for the iperf tool, the client being opened on data center 102A. The iperf performance tool on data center 102B is configured to send data packets to the client on data center 102A, through the data plane. The client on data center 102A receives the data packets and performs various diagnostics on the received data, measuring metrics, among them, the throughput of data packets. The client presents the metrics to performance controller 132A.

Performance controller 132A then analyzes the data and determines the issue. For example, performance controller 132A might determine that throughput is too low, ping various components within computer system 100 to make sure that the components respond, and that the components respond within a certain amount of time. Performance controller 132A might determine which components are not behaving correctly, and either take the problematic components offline or provide more resources to the problematic components. For example, performance controller 132A might determine that gateway 124A, running as a virtual appliance on one of hosts 104A, is operating too slowly. Performance controller 132A might then migrate gateway 124A to another host 104A, or performance controller 132A might modify settings within host 104A that is hosting gateway 124A so that host 104A provides more of its physical resources to gateway 124A.

Configuration engine 134A contains firewall and other security settings for data center 102A, and is able to change those settings upon request. Before initiating execution of performance tool 136A, configuration engine 134A modifies firewall and other security settings within data center 102A to "test mode" so as to open up certain paths and connections within the data plane of data center 102A. Configuration engine 134 opens up these paths and connections to enable testing of the paths and connections. Upon completion of execution of performance tool 136A, configuration engine 134A modifies firewall and other security settings within data center 102A from "test mode" back to "normal mode," or to whatever the firewall and security settings were before they were changed to test mode.

Figure 2:
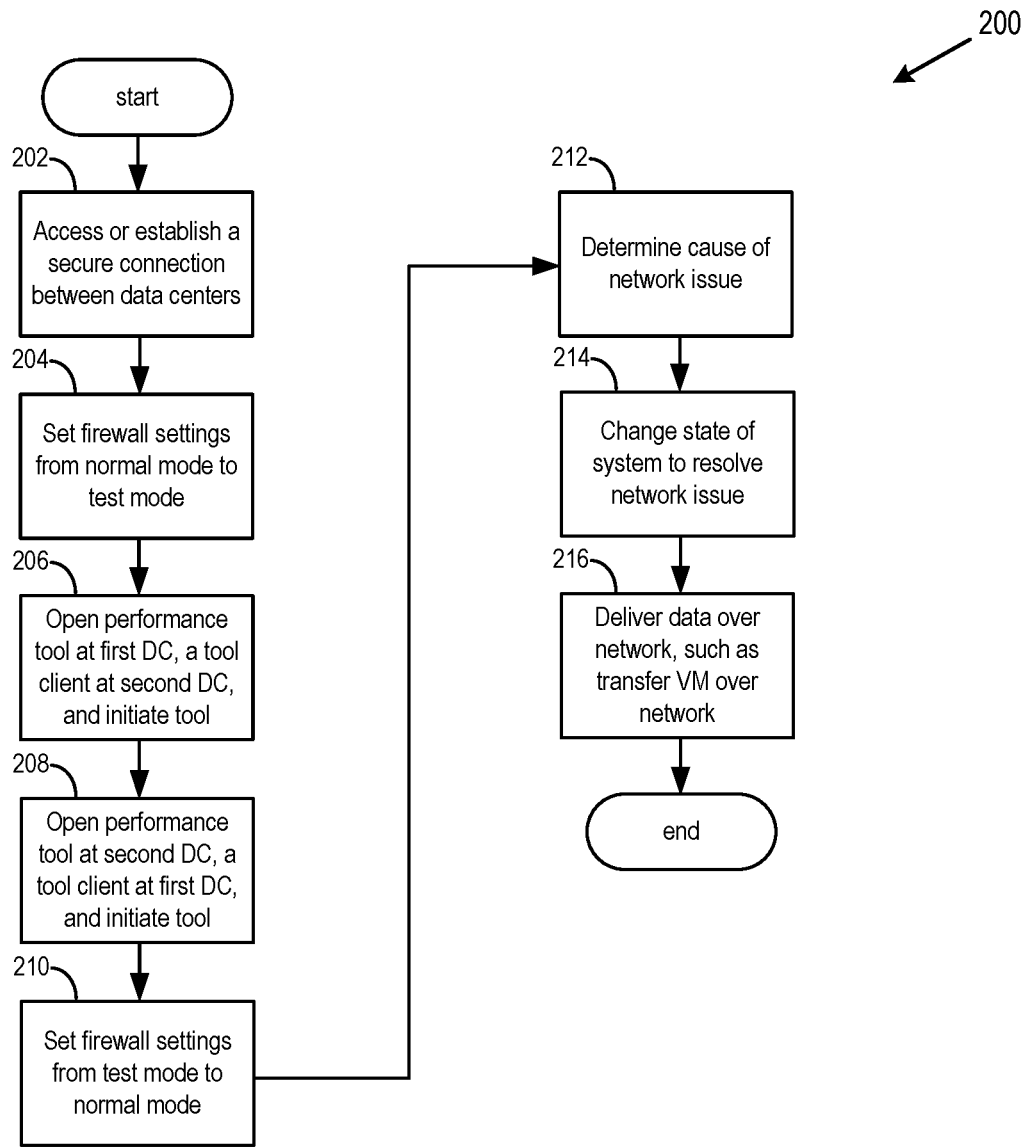
FIG. 2 depicts a flow diagram of a method of diagnosing a network and delivering data over the network, according to an embodiment.

FIG. 2 depicts a flow diagram of a method 200 of diagnosing a network and delivering data over the network, according to an embodiment. Method 300 may be performed by performance controller 132A and/or performance controller 132B. Although method 300 is described as initiated at data center 102A with performance controller 132A managing method 300, method 300 may be initiated at data center 102B, with performance controller 132B managing method 300.

At block 202, performance controller 132A accesses or establishes a secure connection between data centers 102A and 102B. Performance controller 132A may access an already existing secure connection, or performance controller 132A may establish a new secure connection. The secure connection may include point-to-point encryption techniques, such as those of Internet Protocol Security (IPSec). As part of block 202, performance controller 132A may establish a protocol connection on top of the secure connection. The protocol may be remote procedure call (RPC) protocol, specifically the gRPC protocol.

At block 204, performance controller 132A contacts configuration engine 134A to place firewall and other security settings on data center 102A to test mode. Configuration engine 134A may save the current firewall and other security settings to storage 114A before changing the settings to test mode so as to open up to testing certain paths and connections on the data plane of computer system 100. As part of block 204, performance controller 132 contacts remote configuration engine 134B of data center 102B. Configuration engine 134B may save the current firewall and other security settings to storage 114A before changing the settings to test mode so as to open up to testing certain paths and connections on the data plane of computer system 100. As part of block 204, both configuration engine 134A and configuration engine 134B change firewall and other security settings to test mode on data center 102A and data center 102B, respectively.

At block 206, performance controller 132A opens an instance of performance tool 136A on data network 122B of data center 102B. Performance controller 132A also opens performance tool client 138A on data network 122A of data center 102A. Performance controller 132A initiates performance tool 136A. Performance tool 136A begins to send data packets over data plane of computer system 100 to performance tool client 138A. As performance tool 136A sends data packets to performance tool client 138A, performance tool client 138A measures and records metrics associated with the data packets. After testing of packet flow from data center 102B to data center 102A completes, performance controller 132A closes the instance of performance tool 136A, closes performance tool client 138A, and obtains the metrics measured and recorded by performance tool client 138A.

At block 208, performance controller 132A contacts performance controller 132B of data center 102B. Performance controller 132B then proceeds to perform similar steps as those of block 206, but with packets flowing from data center 102A to data center 102B. That is, performance controller 132B opens an instance of performance tool 136B (which may be the same tool as performance tool 136A) on data network 122A of data center 102A. Performance controller 132B also opens performance tool client 138B on data network 122B of data center 102B. Performance controller 132B initiates performance tool 136B. Performance tool 136B sends data packets over data plane of computer system 100 to performance tool client 138B. As performance tool 136B sends data packets to performance tool client 138B, performance tool client 138B measures and records metrics associated with the data packets. After testing of packet flow from data center 102A to data center 102B completes, performance controller 132B closes the instance of performance tool 136B, closes performance tool client 138B, and obtains the metrics measured and recorded by performance tool client 138B.

At block 210, performance controller 132A notifies configuration engine 134A that testing of packet flows has completed. Configuration engine 134A modifies firewall and other security settings of data center 102A from test mode to normal operation mode so as to close certain paths and connections that were previously opened for testing. Modifying firewall and other security settings from test mode to normal mode may involve accessing and restoring previously saved firewall and security settings, which were saved at block 204 of method 300. Performance controller 132A also notifies configuration engine 134B that testing of packet flows has completed. Configuration engine 134B modifies firewall and other security settings of data center 102B from test mode to normal operation mode by closing certain paths and connections, such as by accessing and restoring previously saved firewall and security settings of block 204.

At block 212, performance controller 132A uses metrics obtained at blocks 206 and 208 to determine a cause of a network issue. For example, performance controller 132A might determine that throughput is too low by comparing bandwidth capacity of the data plane of computer system 100 to measured throughput. Or, performance controller 132 might determine that latency is too high by comparing measured latency to a target latency value.

At block 214, performance controller 132A changes the state of computer system 100 to resolve issue determined at block 212. As part of block 212, performance controller 132A may perform additional testing to pinpoint the source of the issue determined at block 212. For example, performance controller 132A might ping components within computer system 100, and either take problematic components offline or provide more resources to problematic components.

At block 216, performance controller 132A/132B or virtualization manager 130A sends data over the data plane of computer system 100 after the network issue of block 212 is resolved at block 214. For example, virtualization manager 130A might migrate VM 120 over data plane of computer system 100, from data center 102A to data center 102B, at a faster throughput, a decreased latency, a decreased jitter, or improved reachability. VM 120 may be migrated by VM migration methods known in the art, such as the method described in U.S. Publication No. 2013/0205106, published Aug. 8, 2013, or the method described in U.S. Pat. No. 9,870,324, issued Jan. 16, 2018. The entire contents of both of these documents are incorporated by reference herein.

It should be understood that, for any process described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of diagnosing a data plane of a network, wherein the network spans a first data center and a second data center, and wherein the second data center is remote to the first data center, the method comprising:

accessing, by a first performance controller of the first data center, a secure connection between the first data center and the second data center;

modifying, by the first performance controller, firewall settings of the first data center from a first setting to a second setting;

opening on the second data center, by the first performance controller, an instance of a performance tool;

opening on the first data center, by the first performance controller, a client of the instance of the performance tool;

sending, by the instance of the performance tool to the client, data packets over the data plane of the network;

receiving, by the client, the data packets;

generating, by the client, metrics associated with the data packets; and modifying, by the first performance controller, firewall settings of the first data center from the second setting to the first setting.

2. The method of claim 1, further comprising:

determining, by the first performance controller or a second performance controller of the second data center, an issue of the data plane of the network based on the generated metrics associated with the data packets; and resolving, by the first performance controller or the second performance controller, the issue.

3. The method of claim 2, wherein the resolving the issue comprises improving at least one of network bandwidth, network latency, network jitter, or network reachability of the data plane of the network.

4. The method of claim 2, wherein the resolving the issue comprises migrating a virtual machine (VM) from one host computer to another host computer.

5. The method of claim 1, further comprising:
prior to the sending, modifying by a second performance controller module of the second data center, firewall settings of the second data center from a third setting to a fourth setting; and
subsequent to the receiving, modifying, by the second performance controller module, firewall setting of the second data center from the fourth setting to the third setting.

6. The method of claim 1, further comprising:
opening on the first data center, by a second performance controller, a second instance of the performance tool;
opening on the second data center, by the second performance controller, a second client of the second instance of the performance tool; and
sending, by the second instance of the performance tool to the second client, data packets over the data plane of the network.

7. The method of claim 1, further comprising establishing a remote procedure call (RPC) protocol connection between the first data center and the second data center, over the secure connection.

8. The method of claim 1, wherein the modifying firewall settings comprises opening or closing a network port.

9. A non-transitory computer readable medium comprising instructions to be executed in a processor of a computer system, the instructions when executed in the processor cause the computer system to carry out a method of diagnosing a data plane of a network, wherein the network spans a first data center and a second data center, and wherein the second data center is remote to the first data center, the method comprising:
accessing, by a first performance controller of the first data center, a secure connection between the first data center and the second data center;
modifying, by the first performance controller, firewall settings of the first data center from a first setting to a second setting;
opening on the second data center, by the first performance controller, an instance of a performance tool;
opening on the first data center, by the first performance controller, a client of the instance of the performance tool;
sending, by the instance of the performance tool to the client, data packets over the data plane of the network;
receiving, by the client, the data packets;
generating, by the client, metrics associated with the data packets; and
modifying, by the first performance controller, firewall settings of the first data center from the second setting to the first setting.

10. The non-transitory computer readable medium of claim 9, the method further comprising:
determining, by the first performance controller or a second performance controller of the second data center, an issue of the data plane of the network based on the generated metrics associated with the data packets; and
resolving, by the first performance controller or the second performance controller, the issue.

11. The non-transitory computer readable medium of claim 10, wherein the resolving the issue comprises improving at least one of network bandwidth, network latency, network jitter, or network reachability of the data plane of the network.

12. The non-transitory computer readable medium of claim 10, wherein the resolving the issue comprises migrating a virtual machine (VM) from one host computer to another host computer.

13. The non-transitory computer readable medium of claim 9, the method further comprising:
prior to the sending, modifying by a second performance controller module of the second data center, firewall settings of the second data center from a third setting to a fourth setting; and
subsequent to the receiving, modifying, by the second performance controller module, firewall setting of the second data center from the fourth setting to the third setting.

14. The non-transitory computer readable medium of claim 9, the method further comprising:
opening on the first data center, by a second performance controller, a second instance of the performance tool;
opening on the second data center, by the second performance controller, a second client of the second instance of the performance tool; and
sending, by the second instance of the performance tool to the second client, data packets over the data plane of the network.

15. The non-transitory computer readable medium of claim 9, the method further comprising establishing a remote procedure call (RPC) protocol connection between the first data center and the second data center, over the secure connection.

16. The non-transitory computer readable medium of claim 9, wherein the modifying firewall settings comprises opening or closing a network port.

17. A computer system comprising;
a first data center;
a second data center remote to the first data center;
a network, the network comprising a data plane, and the network spanning the first data center and the second data center; and
a processor, wherein the processor is programmed to carry out a method of diagnosing the data plane of the network, the method comprising:
accessing, by a first performance controller of the first data center, a secure connection between the first data center and the second data center;
modifying, by the first performance controller, firewall settings of the first data center from a first setting to a second setting;
opening on the second data center, by the first performance controller, an instance of a performance tool;
opening on the first data center, by the first performance controller, a client of the instance of the performance tool;
sending, by the instance of the performance tool to the client, data packets over the data plane of the network;
receiving, by the client, the data packets;
generating, by the client, metrics associated with the data packets; and
modifying, by the first performance controller, firewall settings of the first data center from the second setting to the first setting.

18. The computer system of claim 17, further comprising:
determining, by the first performance controller or a second performance controller of the second data center, an issue of the data plane of the network based on the generated metrics associated with the data packets; and resolving, by the first performance controller or the second performance controller, the issue.

19. The computer system of claim 18, wherein the resolving the issue comprises improving at least one of network bandwidth, network latency, network jitter, or network reachability of the data plane of the network.

20. The computer system of claim 18, wherein the resolving the issue comprises migrating a virtual machine (VM) from one host computer to another host computer.

* * * * *